UNITED STATES PATENT OFFICE 2,495,728

COMPOSITION FOR REMOVING PAINT AND VARNISH FROM COATED SURFACES

Canfield Hutson, James C. Kidd, and Carl E. Blair, Cumberland, Md., assignors to Celanese Corporation of America, a corporation of Delaware No Drawing. Application October 10, 1945, Serial No. 621,596

1 Claim. (Cl. 252—161)

This invention relates to a cleaning composition and relates more particularly to a composition for aiding in the removal of paints, varnishes and adhesives of various types from painted and coated surfaces.

An object of this invention is the provision of an improved cleaning composition particularly adapted for the softening and removal of paint coatings from surfaces to which paint has been applied.

Another object of this invention is to provide a paint, varnish, and adhesives softening composition especially adapted to aid in the removal of coatings of paint, varnishes and adhesives from smooth surfaces, such as glass, woods, tile, metal and the like.

Other objects of this invention will appear from the following detailed description.

In removing paint coatings from painted surfaces, burning, chipping and scraping is often resorted to. However, such methods of removing the paint coatings are only practical when the painted surfaces cannot be permanently damaged by the flame, heat or the chipping tool. Moreover, such methods are laborious and relatively costly. Frequently, the paint is softened by a suitable agent or medium before removal. Softening of the paint not only reduces the labor required in the removal of the paint, but also is a requisite where the painted surfaces are brittle, such as surfaces of glass or ceramic tile, or where the painted surfaces are of a soft wood. To function efficaciously, the softening agent or medium should remain in contact with the paint coating long enough to exert the desired softening effect thereon. Where vertical surfaces are to be acted upon, the softening agent or medium tends to run off the surface, thus presenting a considerable problem.

We have now found a novel paint softening medium which is free from the foregoing and other disadvantages. In accordance with our invention, an improved paint removing agent which is highly active in softening widely different paint base materials may be prepared by combining certain solvent, softening and other components and, in addition, incorporating therein a film-forming base material which on application of the paint removing composition to the painted surface forms a thin film or skin over the paint removing composition. The incorporation of said film-forming base material in the novel paint removing agent of our invention greatly increases the efficiency of said agent. The film-forming base material not only permits close control of the precise area to which the agent is applied, but the film or skin which forms on the surface of the paint removing agent after it has been applied also enables the solvent and softening agents which are thereby confined within said film to exert their maximum softening and solvent action.

The film-forming base materials which may be incorporated in said paint removing agent in accordance with our invention may be cellulose esters, such as cellulose nitrate, cellulose acetate, cellulose propionate, cellulose butyrate, cellulose acetate-propionate and cellulose acetate-butyrate, as well as cellulose ethers, such as ethyl cellulose and benzyl cellulose. Other materials forming the desired thin film or skin on the surface of the paint removing agent may also be incorporated in said agent, such as paraffin wax.

In forming our novel paint, varnish, and adhesive removing composition, for example, 1.0 to 2.5 parts by weight of paraffin wax are dissolved in 5.5 to 9.0 parts by weight of benzene to which is then added 12.0 to 18.0 parts by weight of either a cyclic aliphatic oxide, such as tetramethylene oxide, or of a substantially equal mixture of aliphatic alcohols, such as, a mixture of propyl and butyl alcohol, or both. To this mixture is added 6.0 to 9.0 parts by weight of an aliphatic acid ester, such as, ethyl acetate, mixed with 14.0 to 22.0 parts by weight of a 25% solution of cellulose acetate in acetone, together with 0.6 to 0.9 part by weight of a surface active agent such as, for example, a long chain alkyl benzene sulfonate or the diamyl, diisobutyl, dihexyl or dioctyl ester of sodium sulfosuccinic acid.

As a paint removing composition it is applied to the painted surface from which it is desired to remove the paint, in any convenient manner, such as by spraying, brushing, dipping and the like. After a short period, say 1 to 30 minutes to allow for drying and the dissolution of the paint, the film produced is removed with a wide scraping blade and/or a wire brush. The paint comes away very easily and the film-forming base materials in the paint removing composition maintains the layer of paint which is removed in a substantially coherent form. This action not only permits easy removal of the paint but prevents smearing or running and avoids the dropping of softened paint about the area in which the work is being carried out.

In order further to illustrate our invention but without being limited thereto the following examples are given:

Example I

A composition comprising the following components is prepared as described:

| | Parts by weight |
|---|---|
| Benzene | 7.30 |
| Paraffin wax | 1.25 |
| Mixed propyl and butyl alcohol | 15.00 |
| Ethyl acetate | 7.50 |
| Acetone containing 25% of cellulose acetate | 18.00 |
| Aerosol OT (the dioctyl ester of sodium sulfosuccinic acid) | 0.75 |
| | 49.80 |

Example II

A composition comprising the following components is prepared as described:

| | Parts by weight |
|---|---|
| Benzene | 7.30 |
| Paraffin wax | 1.25 |
| Tetramethylene oxide | 15.00 |
| Ethyl acetate | 7.50 |
| Acetone containing 25% of cellulose acetate | 18.00 |
| Aerosol OT (the dioctyl ester of sodium sulfosuccinic acid) | 0.75 |
| | 49.80 |

The composition of either Example I or II is brushed on to a dried coating of an asphalt base paint which had previously been applied to a glass surface. After 3 minutes, in which time the film or skin forming ingredient of the paint removing composition, i. e. cellulose acetate, has partially dried and the softening medium has acted upon the coating of paint, the whole is removed with a wide-bladed scraping knife or spatula. A short brushing action with a wire brush completes the removal of the coating from depressions. The film of cellulose acetate formed over the whole concentrates the softening action on the paint and enables the latter to be removed in a substantially continuous coherent mass. The application of our novel paint removing composition produces a quick and clean paint removing action.

In addition to asphalt base paints, our novel paint removing composition is equally satisfactory in the removal of tar base, mastic, enamel, lacquer and oil base paints from surfaces to which such paints have been applied.

It is to be understood that the foregoing detailed description is given merely by way of illustration and that many variations may be made therein without departing from the spirit of our invention.

Having described our invention, what we desire to secure by Letters Patent is:

A homogeneous liquid composition adapted for the removal of dried paint, varnishes and adhesives from coated surfaces, comprising 3.5 to 5.5 parts by weight of cellulose acetate, 10.5 to 16.5 parts by weight of acetone, 1.0 to 2.5 parts by weight of paraffin wax, 0.6 to 0.9 part by weight of a surface active agent soluble in the solvent of said composition, comprising the dioctyl ester of sodium sulfosuccinic acid, 5.5 to 9.0 parts by weight of benzene, 12.0 to 18.0 parts by weight of tetramethylene oxide and 6.0 to 9.0 parts by weight of ethyl acetate.

CANFIELD HUTSON.
JAMES C. KIDD.
CARL E. BLAIR.

REFERENCES CITED

The following references are of record in the file of this patent:

UNITED STATES PATENTS

| Number | Name | Date |
|---|---|---|
| 901,895 | Ellis | Oct. 20, 1908 |
| 1,049,467 | Ellis | Jan. 7, 1913 |
| 1,129,770 | Wilson et al. | Feb. 23, 1915 |
| 1,143,878 | Alexander | June 22, 1915 |
| 1,173,628 | Wilson et al. | Feb. 29, 1916 |
| 1,495,547 | Clark | May 27, 1924 |
| 1,884,769 | Lougovoy | Oct. 25, 1932 |
| 2,052,884 | Leatherman | Sept. 1, 1936 |
| 2,255,229 | Reppe et al. | Sept. 9, 1941 |
| 2,388,082 | Roediger | Oct. 30, 1945 |
| 2,418,138 | Packer | Apr. 1, 1947 |